Patented May 18, 1948

2,441,665

UNITED STATES PATENT OFFICE 2,441,665

DIAMINES

Walter F. Holcomb, Detroit, and Leon A. Sweet, Grosse Pointe Park, Mich., assignors to Parke, Davis & Company, Detroit, Mich., a corporation of Michigan No Drawing. Application August 7, 1942, Serial No. 454,064

10 Claims. (Cl. 260—279)

The invention relates to new and valuable therapeutic substances and to a new class of alkylene diamine compounds.

The new products of the invention have, for their free base forms, the general formula,

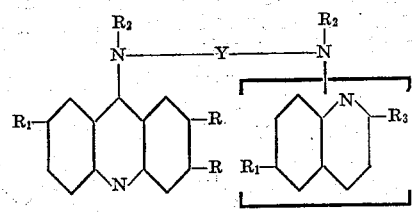

where R is H, —OH, —Cl, —Br, —NO$_2$, —NH$_2$ or —CN, R$_1$ is alkyl, lower alkyloxy, hydroxy lower alkyl and hydroxy lower alkyloxy, R$_2$ is hydrogen or lower alkyl, R$_3$ is hydrogen, lower alkyl, lower alkyloxy, hydroxy lower alkyl and hydroxy lower alkyloxy and Y is an alkylene residue of 2 to 12 carbon atoms which may be interrupted by —O—, —S—, —NH—, —N(lower alkyl)— or —N= and may in either case be substituted on a carbon atom thereof by —NO$_2$, —NH$_2$, —NH(lower alkyl)—, —N(lower alkyl)$_2$, —NHOH, =O, —Cl or Br.

Examples of Y groups are the following:

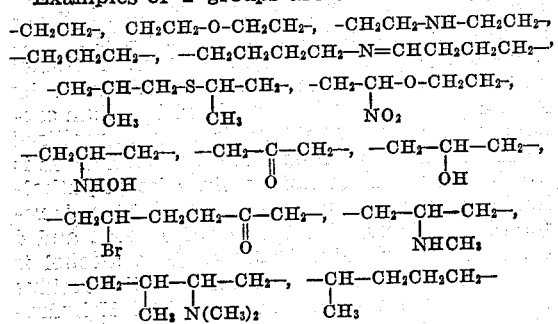

Various non-toxic inorganic and organic acid addition salts of the amine free bases described are included in the invention. For example salts can be obtained with inorganic acids such as hydrochloric, sulfuric, phosphoric and boric acids. Also with organic acids such as lactic, citric, salicylic, benzoic, naphthoic, nicotinic, maleic and phthalic acids.

The following examples illustrate the invention:

Example I

The preparation of a chloroform solution of the free base, 8-γ-aminopropylamino-6-methoxy quinoline, is described by Baldwin in Journal of the Chemical Society, 1929, page 2959 et seq. The free base itself can be obtained by evaporating off the chloroform and fractionally distilling the residue. 10.5 grams of the main fraction, consisting of a uniform liquid, are added to a mixture of 10 g. of 3,9-dichloro-7-methoxy-acridine and 50 g. of phenol which mixture has been previously heated on a steam bath for 15 minutes. The 3,9-dichloro-7-methoxy acridine can be obtained, for example, as described in U. S. Patent 1,855,302. The mixture of the phenol and the quinoline and acridine compounds is heated on the steam bath for a period of 4 hours.

The reaction mixture is taken from the steam bath and treated with 500 cc. of 5% sodium hydroxide solution, the supernatant liquid is decanted off and the residue washed once with 5% sodium hydroxide solution and then washed several times with water. The washed residue is taken up in 300-400 cc. of diethyl ether, dried over potassium carbonate, filtered, the filtrate concentrated to 100 cc., dried again with potassium carbonate and filtered, and the filtrate treated with alcoholic HCl and a little more ethanol. The bright orange colored solid is filtered off and dried. It melts at 234-236° C. and upon recrystallization from cellosolve (ethylene glycol monoethylether) gives 3-chloro-7-methoxy-9-(γ-6'-methoxy-8'-quinolylaminopropyl-amino) acridine.

The preparation of the products of this example can be illustrated by the following diagram:

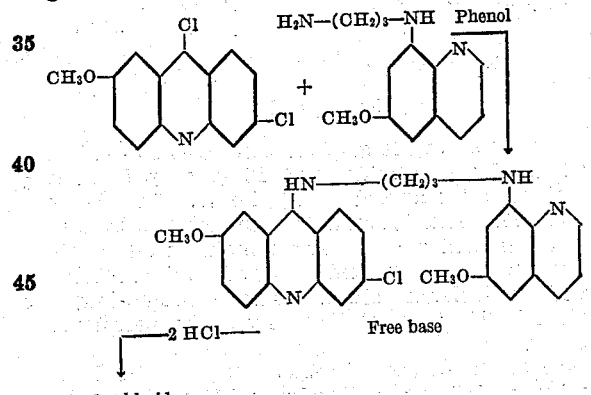

The product of this example is especially valuable as an antimalarial and has a therapeutic index several times that of the known antimalarials. The maximum tolerated dose for the new product is exceptionally high.

Example II

The procedure for this example is analogous to that for Example I except that 8-ω-aminopentylamino-6-methoxy quinoline is reacted with the 3,9-dichloro-7-methoxy acridine and phenol. The reaction product is isolated as for the product of Example I and recrystallized from water to give a product melting at 135-138° C. with decomposition. A sample crystallized from alcohol and then recrystallized twice from methanol has a melting point of 148-150° C. It is the mono-hydrochloride of 3-chloro-7-methoxy-9(ω-6'-methoxy-8'-quinolyl aminopentylamino) acridine and its free base has the formula,

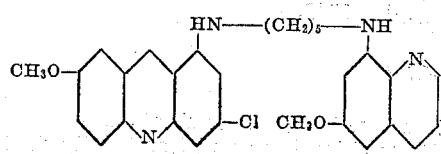

The 8-ω-aminopentylamino-6-methoxy quinoline used in the example may be prepared as described by Baldwin, Journal of the Chemical Society, 1929, page 2959 et seq.

Example III 6-methoxy-8-(β amino ethyl) amino quinoline is prepared as described by Baldwin (J. Chem. Soc., 1929, p. 2959). Seven grams of this quinoline compound is added to a mixture of 7.1 g. of 3,9-dichloro-7-methoxy acridine and 35 g. of phenol which has already been heated on the steambath for 15 minutes. The mixture of the quinoline and acridine compounds is heated on the steambath for 5 hours, then cooled and taken up in 300 cc. of ether. The ether solution is washed 5 times with 100 cc. portions of 5% sodium hydroxide solution and twice with water. The ether solution is dried over magnesium sulfate and then evaporated to a volume of about 100 cc. An equal volume of absolute ethanol is added and the solution boiled with charcoal and filtered. Addition of alcoholic hydrogen chloride to the filtrate gives an orange precipitate. This is separated and crystallized from methanol and has a melting point of 234-6° C. (with decomposition). The compound is a dihydrochloride of formula,

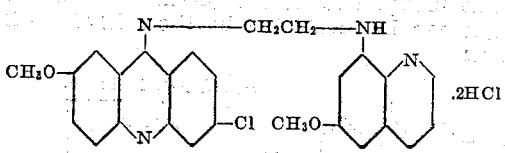

Example IV

A mixture of 140 g. of tetramethylene bromide, 25 g. of phthalimide, and 13 g. of potassium carbonate is refluxed for 2½ hours. The excess tetramethylene bromide is then removed by distillation with steam. The remaining oil solidifies upon cooling, and is dried and extracted with petroleum ether. The ω-bromo-butyl-phthalimide is crystallized from the petroleum ether.

27 grams of the ω-bromobutyl phthalimide, is mixed with 5 cc. of Cellosolve and 15 g. of 6-methoxy-8-amino-quinoline and heated to 125-130° for 6 hours with occasional stirring. The reaction product is ground in a mortar, boiled with 100 cc. of absolute ethanol, and filtered. The free base is liberated by trituration of the hydrobromide with 5% sodium carbonate solution. The base is taken up in and crystallized from ethanol which contains a little ammonia.

The phthalimido compound, 13.2 g., is refluxed 1½ hours with 100 cc. of ethanol and 4 cc. of 85% hydrazine hydrate. The alcohol is evaporated in a stream of air and the residue heated 30 minutes with 250 cc. of 3.2 N hydrochloric acid. The mixture is cooled and filtered, and the filtrate neutralized with ammonia. The solution is saturated with potassium carbonate and extracted 3 times with 200 cc. portions of chloroform. The combined chloroform extracts are dried over potassium carbonate and then evaporated to dryness. The 6-methoxy-8-(ω-amino butyl) aminoquinoline is a dark viscous oil and can be used without further purification. 6-methoxy-8-(ω-aminobutyl)-amino quinoline, 7.7 g., is heated 5 hours with 7.1 g. of 3,9-dichloro-7-methoxy-acridine and 35 g. of phenol. The reaction mixture is worked up as described for 3-chloro-7-methoxy-9(β-6'-methoxy-8'-quinolyl-aminoethylamino) acridine. The product crystallizes from methanol as a yellow solid. It may be obtained in the form of its free base or as its acid addition salts with various mineral and organic acids. The product in the form of its free base has the formula,

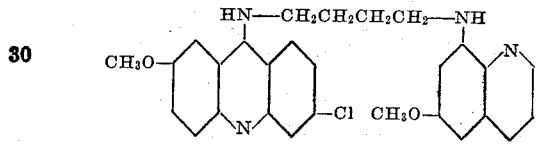

The dihydrochloride melts at 231-233° C. (decomp.).

Example V

A mixture of 100 g. of hexamethylene bromide, 23.2 g. of phthalimide, and 16.6 g. of potassium carbonate is refluxed for 2½ hours. The excess hexamethylene bromide is then removed by distillation with steam. The residual oil does not solidify, but low melting, solid ω-bromo hexyl phthalimide is obtained by dissolving the oil in methanol and cooling the solution in an ice bath.

ω-Bromohexyl phthalimide, 26 g., is heated with 5 cc. of cellosolve and 15 g. of 6-methoxy-8-amino-quinoline for 6 hours at 125-135°. The semi-solid product is boiled with 100 cc. of ethanol and filtered. The free base is liberated by trituration of the hydrobromide with sodium carbonate solution. The base is then crystallized from ethanol containing a little ammonia. It is ω-(6'-methoxy-8'-quinolyl amino) hexyl phthalimide. This phthalimido compound, 14 g., is refluxed 1½ hours with 100 cc. of ethanol and 4 cc. of 85% hydrazine hydrate. The alcohol is evaporated in a stream of air and the residue heated 30 minutes with 250 cc. of 3.2 N hydrochloric acid. The mixture is cooled and filtered, and the filtrate neutralized with ammonia. The solution is saturated with potassium carbonate and extracted 3 times with 200 cc. portions of chloroform. The combined extracts are dried over potassium carbonate and evaporated to dryness. The 6-methoxy-8-(ω-aminohexyl) aminoquinoline is a viscous oil, and is used directly in the next reaction.

6-methoxy-8(ω-aminohexyl)-amino-quinoline, 8.8 g., is mixed with 7.1 g. of 3,9-dichloro-7-methoxy-acridine and 35 g. of phenol and the mixture heated on the steam bath for 5 hours. The reaction mixture is worked up as described for 3 - chloro -7- methoxy-9-(β-6'-methoxy-8'-quinolyl - amino - ethyl amino) - acridine. The product crystallizes from methanol as a yellow solid. The free base can be reacted with various organic and inorganic acids to obtain acid addition salts. The free base is, 3-chloro-7-methoxy-9(ω-6'-methoxy-8'-quinolyl - aminohexylamino)-acridine.

Example VI

A mixture of 100 g. of decamethylene bromide, 18.9 g. of phthalimide, and 9.5 g. of potassium carbonate is heated to 200° for 2½ hours. The excess decamethylene bromide is removed by distillation with steam. The residual oil does not crystallize but can be directly used to react with an amino quinoline.

The oily ω-bromodecyl phthalimide, 35 g., is mixed with 5 cc. of cellosolve and 15 g. of 6-methoxy-8-amino-quinoline and heated to 125–130° for 6 hours with occasional stirring. The reaction product is boiled with 100 cc. of ethanol, then cooled and filtered. The hydrobromide is triturated with sodium carbonate solution and the free base crystallized from ethanol which contains a little ammonia. The phthalimido compound, 16 g., is refluxed for 1½ hours with 100 cc. of ethanol and 4 cc. of 85% hydrazine hydrate in order to convert the phthalimido group to an amino group (—NH₂). The alcohol is evaporated in a stream of air and the residue heated 30 minutes with 250 cc. of 3.2 N hydrochloric acid. The mixture is cooled and filtered, and the filtrate neutralized with ammonia. The solution is saturated with potassium carbonate and extracted 3 times with 200 cc. portions of chloroform. The chloroform is dried over magnesium sulfate and evaporated to dryness. The residue, 6-methoxy-8-(ω-aminodecyl)-amino-quinoline, is a dark oil. It is used in the next reaction without further purification.

6-methoxy-8-(ω-aminodecyl) - amino - quinoline, 10.7 g., is mixed with 7.1 g. of 3,9-dichloro-7-methoxy-acridine and 35 g. of phenol and heated on the steam bath for 5 hours. The reaction mixture is worked up as described for 3-chloro-7-methoxy-9-(β-6'-methoxy -8'- quinolyl-amino-ethyl-amino)-acridine. The product crystallizes from methanol as a yellow solid. The free base is, a 3-chloro-7-methoxy-9(ω-6'-methoxy-8'-quinolyl-aminodecylamino) acridine.

Example VII 2-methoxy-7-nitro -9- chloroacridine can be prepared by the method of Dhar, Narang and Ray, Journal of the Chemical Society, 304 (1938). A solution of 8.7 g. (0.03 mole) of this compound in 36 g. of phenol is obtained by warming the two substances together on the steam bath. 6.9 g. (0.03 mole) of 8-(γ-aminopropylamino)-6-methoxy quinoline are added to the phenol solution of the acridine compound and the mixture is heated on the steam bath for a period of 4 hours.

The reaction solution is poured into an excess of 5% sodium hydroxide solution and the precipitated gum-like base is extracted with chloroform. The chloroform extracts are washed successively with dilute sodium hydroxide solution and water and dried over anhydrous potassium carbonate. The dry chloroform solution is filtered off and an excess of alcoholic hydrogen chloride added. A precipitate of the dihydrochloride of 2 - methoxy-7-nitro-9-[γ-(6'-methoxy-8'-quinolyl-amino)-propyl amino]-acridine separates out. It is collected and dried. When recrystallized from methanol, ethanol or cellosolve, it has a melting point of 242–244° C.

Example VIII 6 g. of the 7-nitro compound obtained in Example VII are hydrogenated catalytically with Raney nickel catalyst in a solution of boiling alcohol. When the required amount of hydrogen has been absorbed, the catalyst is removed from the reaction mixture by filtration. The alcohol is evaporated off and the residue purified by recrystallization in the form of its hydrochloric acid addition salt. The formula for the free base of this example is,

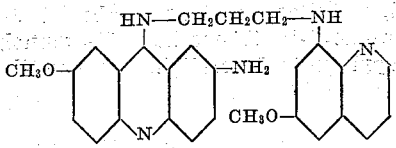

Example IX

Preparation of 2-methoxy-6-nitro-9-chloroacridine is described in U. S. Patent 1,962,277 (1934) and in British Patent 283,510 (1927). A solution of 8.7 g. (0.03 mole) of this acridine compound in 36 g. of phenol is obtained by warming the two substances together on the steam bath. 6.9 g. (0.03 mole) of 8-(γ-aminopropylamino)-6-methoxy-quinoline are added to the phenol solution of the acridine compound. The mixture is heated on the steam bath for about 4 hours and the reaction mixture worked up in a manner analogous to that described for the 7-nitro isomer described under Example VII. The free base product is 2-methoxy-6-nitro-9-[γ-(6'-methoxy-8'-quinolyl amino)-propyl amino]-acridine. The free base may be reacted with various organic or inorganic acids as already described above.

Example X

In this example, the 2-methoxy-6-nitro-9-[γ-(6'-methoxy-8'-quinolyl amino)-propyl amino]-acridine of the preceding example is reduced catalytically to the corresponding 6-amino compound in the same manner as indicated above for the preparation of the 7-amino isomer of Example VIII.

Example XI

Magidson and Trawin, Ber. 69, p. 537 (1936) and Russian Patent 48,307 (1937) describe the preparation of 2-methoxy - 6 - cyano-9-chloroacridine. 8.1 g. (0.03 mole) of this compound are dissolved in 36 g. of phenol by warming the mixture on steam bath. 6.9 g. (0.03 mole) of 8-(γ-aminopropylamino) - 6 - methoxy quinoline are added to the phenol solution of the acridine compound and the mixture heated on the steam bath for about 4 hours. The reaction product is then worked up as indicated for the above described 6-nitro analogue. A high melting hydrochloride is obtained by recrystallization from methanol, ethanol or Cellosolve. The formula for the free base product is,

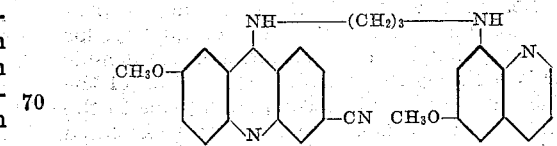

Example XII

Magidson, Grigorovski, Gal'perin, J. Gen.

Chem. (U. S. S. R.), 8, 56 (1938); Chemical Abstracts, 32, 5405 (1938), describe preparation of 2 - methoxy-6-bromo - 9 - chloroacridine. 9.8 g. (0.03 mole) of this compound are dissolved in 36 g. of phenol by warming on a steam bath. 6.9 g. (0.03 mole) of 8-(γ-aminopropylamino)-6-methoxy quinoline are added to the phenol solution of the chloroacridine. The mixture is heated on the steam bath for about 4 hours and then worked up as described for the 6-nitro compound of Example X. The high melting hydrochloride or sulfate, or other suitable acid addition salt, can be obtained by recrystallization from methanol, ethanol, or Cellosolve. The free base is 2-methoxy-6-bromo-9-[γ-(6'-methoxy-8' - quinolylamino)-propyl amino]-acridine. It has the formula,

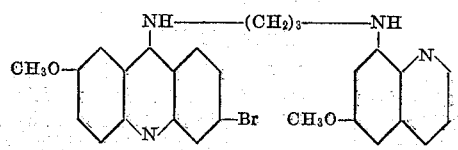

In the specification and claims, whenever the acid addition salts of the diamines with non-toxic acids are referred to, it is intended that the expression "non-toxic" cover only those acids the new diamine salts of which are not so toxic in comparison with their therapeutic and prophylactic effects as to prohibit their safe use with humans.

From the above examples illustrating the preparation of some of the preferred diamine compounds of the invention it is apparent that the general method of preparing our new products can be represented as follows:

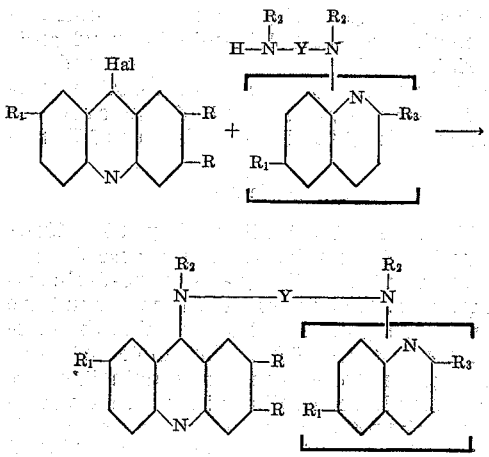

where R, R₁, R₂, R₃ and Y have the same significance as given above and Hal is a halogen atom.

The use of a phenol when reacting a 9-haloacridine, such as a 9-chloro-acridine, is preferred although not necessary, because yields are thereby increased. An intermediate phenolic ether is probably first formed by reaction of the phenol with the acridine compound prior to the reaction with the mono-heterocyclic substituted diamine.

Other known methods of substituting an amino hydrogen atom of an alkylene diamine by a hydrocarbon radical may be used. For example, if one has a monoquinolyl substituted alkylene diamine of formula,

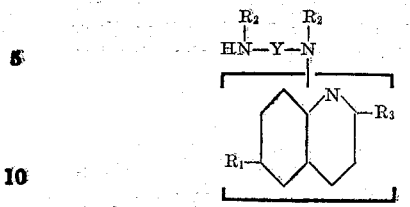

it can be reacted, in an inert solvent such as benzene, with an acid halide such as the halide described by Drozlov, Chemical Abstracts, volume 33, page 4251 (1939), and having the formula,

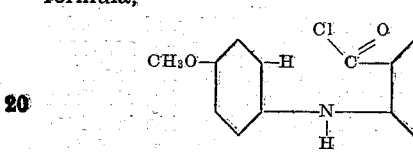

The resulting product has the formula,

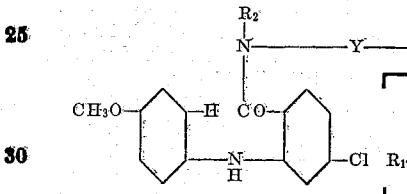

The latter product, when treated several hours with a condensing agent such as phosphorus oxychloride in an inert solvent gives the following diamine,

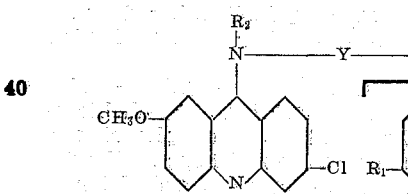

We claim:

1. A compound of the class consisting of diamines and their acid addition salts with non-toxic acids, the formula for the free diamines being

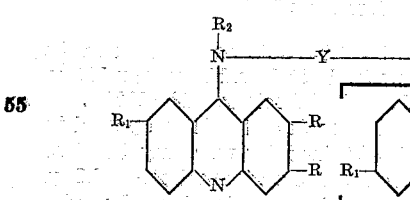

where R is a member of the class consisting of —H, —OH, —Cl, —Br, —NO₂, —NH₂ and —C≡N, R₁ is a member of the class consisting of lower alkyl, lower alkyloxy, hydroxy lower alkyl, and hydroxy lower alkyloxy, R₂ is a member of the class consisting of hydrogen and lower alkyl, R₃ is a member of the class consisting of hydrogen, lower alkyl, lower alkyloxy, hydroxy lower alkyl and hydroxy lower alkyloxy, and Y is an alkylene residue of 2 to 12 carbon atoms of the class consisting of an alkylene residue, an alkylene residue interrupted by a member of the group consisting of —O—, —S—, —NH—, —N(lower alkyl)—, —N=, and such interrupted and uninterrupted alkylene residues substituted on a carbon atom thereof by one of the group consisting of —NO₂, —$NH_2$, —NH(lower alkyl), —N(lower alkyl)$_2$, —NHOH, =O, —Cl and —Br.

2. A compound of the class consisting of diamines and their acid addition salts with non-toxic acids, the formula for the free diamines being

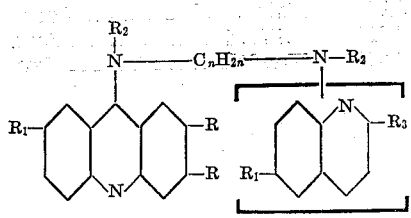

where R is a member of the class consisting of —H, —OH, —Cl, —Br, —$NO_2$, —$NH_2$ and —C≡N, $R_1$ is a member of the class consisting of lower alkyl, lower alkyloxy, hydroxy lower alkyl, and hydroxy lower alkyloxy, $R_2$ is a member of the class consisting of hydrogen and lower alkyl, $R_3$ is a member of the class consisting of hydrogen, lower alkyl, lower alkyloxy, hydroxy lower alkyl and hydroxy lower alkyloxy, and $n$ is an integer greater than one and not more than 12.

3. A compound of the class consisting of diamines and their acid addition salts with non-toxic acids, the formula for the free diamines being

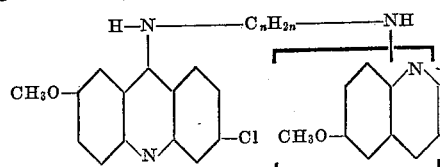

where $n$ is an integer greater than one and not more than twelve.

4. A compound of the class consisting of diamines and their acid addition salts with non-toxic acids, the formula for the free diamines being

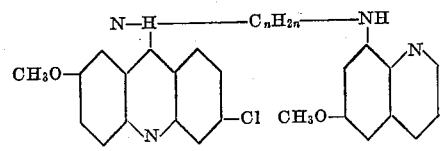

where $n$ is an integer greater than one and not more than twelve.

5. A compound of the class consisting of a diamine and its acid addition salts with non-toxic acids, the formula for the free diamine being

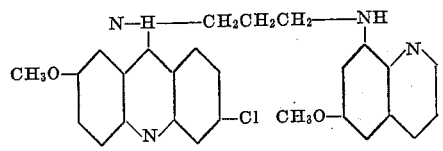

6. A compound of the class consisting of a diamine and its acid addition salts with non-toxic acids, the formula for the free diamine being

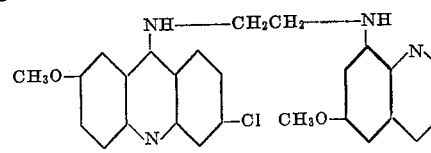

7. A compound of the class consisting of a diamine and its acid addition salts with non-toxic acids, the formula for the free diamine being

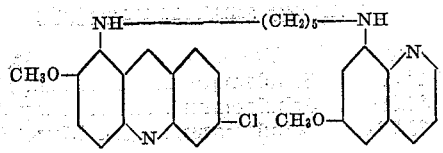

8. Process for the preparation of diheterocyclic substituted alkylene diamines which comprises reacting a compound of formula,

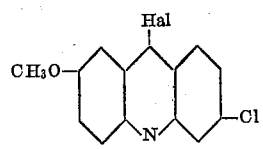

with a compound of formula,

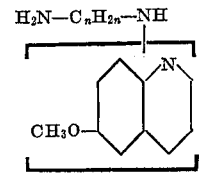

where Hal is a reactive halogen atom and where $n$ is an integer greater than one and not more than twelve.

9. Process for the preparation of diheterocyclic substituted alkylene diamines which comprises reacting an acridine compound of formula,

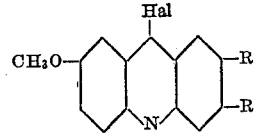

with a compound of formula,

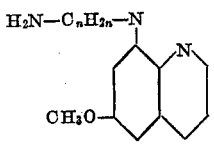

where $n$ is an integer greater than one and not more than twelve and R is a member of the class consisting of —H, —OH, —Cl, —Br, —$NO_2$, —$NH_2$ and —C≡N.

10. Process for the preparation of diheterocyclic substituted alkylene diamines which comprises reacting a compound of formula,

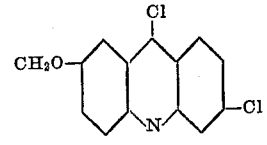

with a compound of formula,

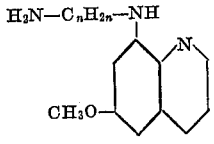

where $n$ is an integer greater than one and not more than twelve.

WALTER F. HOLCOMB.
LEON A. SWEET.

(References on following page)

REFERENCES CITED

The following references are of record in the file of this patent:

UNITED STATES PATENTS

| Number | Name | Date |
|---|---|---|
| 1,747,531 | Schulemann | Feb. 18, 1930 |
| 1,757,394 | Schulemann | May 6, 1930 |
| 1,760,781 | Schulemann | May 27, 1930 |
| 1,852,820 | Murrill | Apr. 5, 1932 |
| 1,889,704 | Schulemann | Nov. 29, 1932 |
| 1,903,196 | Schulemann | Mar. 28, 1933 |
| 2,050,971 | Jensch | Aug. 11, 1936 |
| 2,077,249 | Mietzsch | Apr. 13, 1937 |
| 2,083,908 | Hata et al. | June 15, 1937 |
| 2,126,620 | Clifford | Aug. 9, 1938 |
| 2,307,049 | Kendall | Jan. 5, 1943 |